Figure 1:
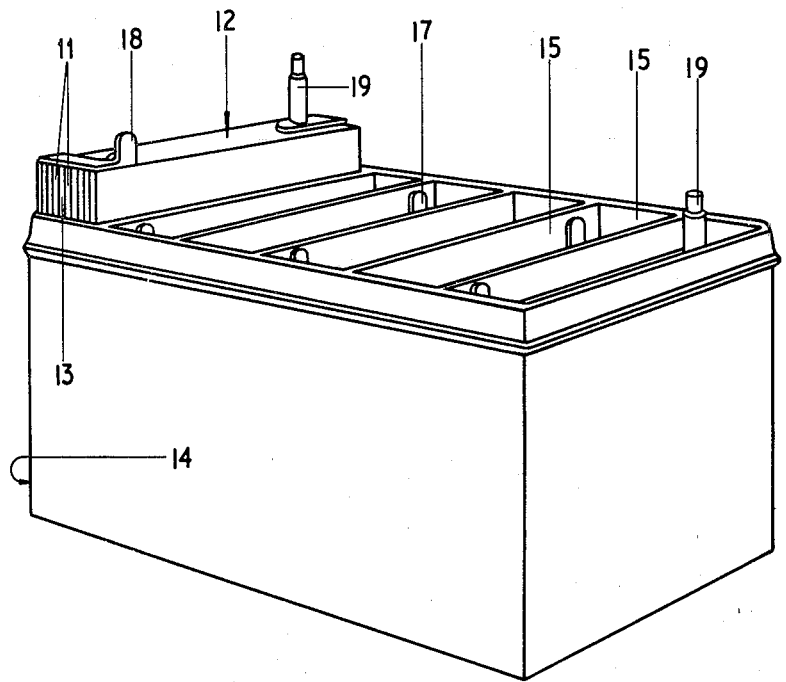

United States Patent [19]

Bant

[11] 4,200,683

[45] Apr. 29, 1980

[54] LEAD-ACID BATTERIES

[75] Inventor: John A. Bant, Solihull, England

[73] Assignee: Lucas Industries Limited, Birmingham, England

[21] Appl. No.: 868,785

[22] Filed: Jan. 12, 1978

[51] Int. Cl.$^2$ .................... H01M 10/06; H01M 10/44
[52] U.S. Cl. ...................................... 429/48; 429/54; 429/204; 429/225; 29/623.2; 204/2.1
[58] Field of Search .................... 429/48, 49, 224–228, 429/110, 118, 54, 204; 204/2.1; 29/623.2

[56] References Cited

U.S. PATENT DOCUMENTS

| | | | |
|---|---|---|---|
| 1,616,585 | 2/1927 | Lea | 204/2.1 |
| 3,629,006 | 12/1971 | Hill | 204/2.1 |
| 3,652,341 | 3/1972 | Halsall et al. | 204/2.1 |
| 3,929,505 | 12/1975 | Burkett et al. | 204/2.1 |
| 3,948,680 | 4/1976 | Mao et al. | 429/118 |
| 3,967,980 | 7/1976 | Sabatino | 29/623.2 |
| 4,098,961 | 7/1978 | Sabatino | 429/48 |

FOREIGN PATENT DOCUMENTS 1489182 10/1977 United Kingdom .

Primary Examiner—Anthony Skapars
Attorney, Agent, or Firm—Ladas, Parry, Von Gehr, Goldsmith & Deschamps

[57] ABSTRACT

A lead-acid battery capable of activation by the addition of electrolyte thereto includes at least one pack of formed positive and negative battery plates with insulating separators being interposed between adjacent plates. Part of the sulphuric acid used to form the plates is retained by the battery and has a specific gravity between 1.25 and 1.35, the amount of the retained acid being insufficient to electrically connect the plates during storage. In addition means is provided to seal the battery against ingress of air but allow gases generated in the battery to escape.

7 Claims, 3 Drawing Figures

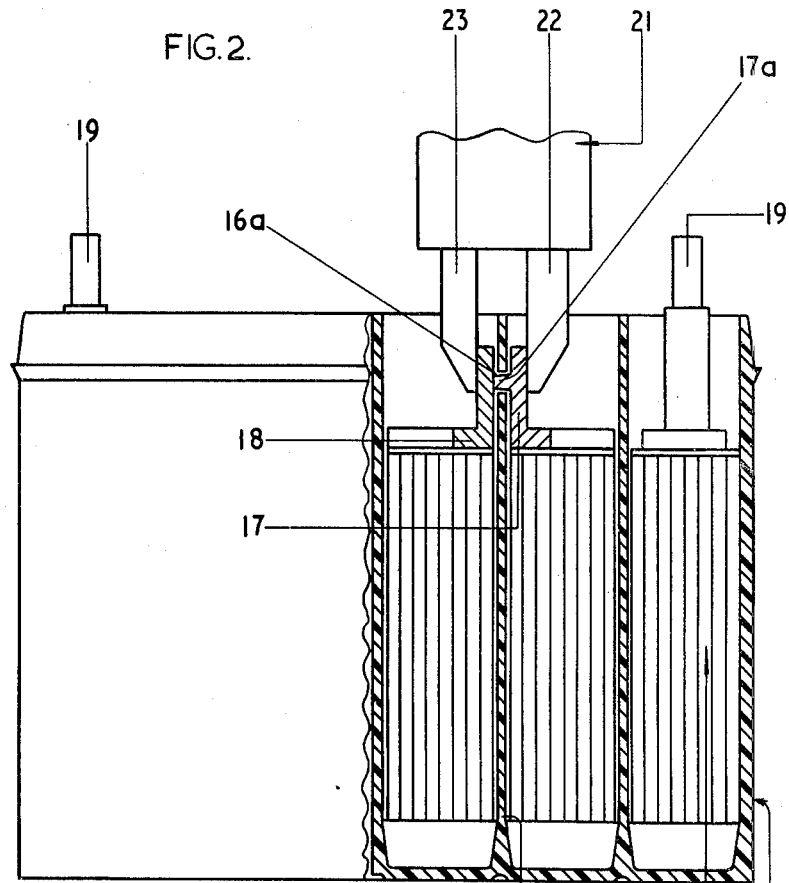
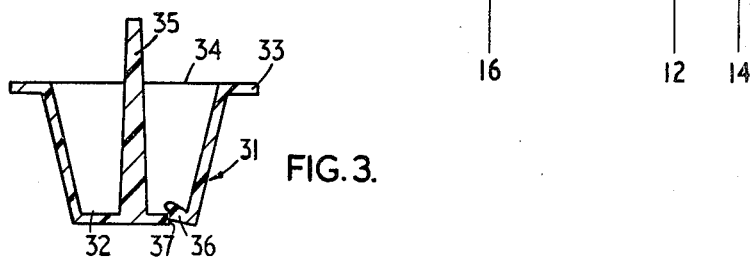

LEAD-ACID BATTERIES

This invention relates to lead-acid batteries.

A problem exists with lead-acid batteries in that they tend to discharge if stored for prolonged periods with the battery elements immersed in the sulphuric acid electrolyte of the battery. One known solution to this problem with "wet" batteries is to produce dry, charged lead-acid batteries. This involves forming the plates of the battery, removing the formation electrolyte and then washing and drying the plates before assembling and sealing the battery. The battery can then be stored substantially without discharge and in addition transport of the battery is facilitated since, of course, the extra weight of the electrolyte is avoided. When required for service activation of the battery is effected by adding sulphuric acid of a suitable specific gravity.

However, dry, charged lead-acid batteries also suffer from a problem in that washing and drying the formed plates is a relatively difficult and expensive operation, but nevertheless must be performed rigorously and completely if the performance of the battery is not to deteriorate during storage. Moreover, with a dry, charged battery after addition of the activation electrolyte, it is necessary to allow the battery to stand to allow the acid to saturate the plates before the battery is ready for service.

With a view to overcoming the above-mentioned disadvantages of wet and dry, charged lead-acid batteries, much recent work has centred on the development of so-called drain, charged batteries. These are similar to dry, charged batteries in that they require activation with electrolyte before they can be put into service but, unlike dry, charged batteries, they are stored with part of the forming electrolyte being retained by the plates. There is therefore no requirement for initial washing and drying of the plates, although it is of course necessary to remove sufficient of the forming electrolyte, normally by merely draining the battery, to prevent adjacent plates being electrically connected through the electrolyte during storage. Moreover, drain, charged batteries can be stored for long periods substantially without discharge and can be put into service immediately upon addition of the required activation electrolyte.

In each of the three types of battery described above, formation of the plates involves immersing grids supporting the required lead-acid battery paste in sulphuric acid and passing an electric current through the plates. Moreover, with dry and drain charged batteries, the acid used for the formation process has to date always been considerably weaker than the sulphuric acid electrolyte employed in the finished battery. Thus, the initial specific gravity of the forming acid has normally been between 1.00 and 1.15 and although there is an increase in the acid strength during forming, the specific gravity of the acid at the end of the forming process has always been less than 1.23. The reason for using a relatively weak forming acid has been to decrease the forming time since at high specific gravities of the sulphuric acid formation electrolyte conversion of the battery paste into the required active material of the plates is resisted.

It has, however, been found that, when conventional strength forming acid is used to produce drain, charged batteries there is a tendency for the retained acid in the positive plates to become depleted during storage by reaction with the negative plate active material. This can result in the pH of the retained electrolyte in the positive plate rising towards a neutral value and under these conditions there is a tendency for the positive plate grid to corrode by reaction with the positive plate active material. Although this problem can be avoided by employing a separate rinse step with a high specific gravity acid after draining of the forming acid, the rinse step adds an extra operation to the battery production cycle and also requires additional acid. It is therefore an object of the present invention to provide an improved solution to the above-mentioned problem with conventional drain, charged batteries.

Accordingly, the invention resides in one aspect in a lead-acid battery capable of activation by the addition of electrolyte thereto and including at least one pack of formed positive and negative battery plates with insulating separators being interposed between adjacent plates, part of the sulphuric acid used to form the plates being retained by the battery and having a specific gravity between 1.26 and 1.35, the amount of said retained acid being insufficient to electrically connect the plates during storage, and means sealing the battery against ingress of air but allowing gases generated in the battery to escape.

In a further aspect, the invention resides in a method of producing a lead-acid battery capable of activation by the addition of electrolyte thereto, the method comprising the steps of:

(a) starting with a battery container accommodating at least one pack of battery plate grids having insulating separators interposed between adjacent grids, one set of grids in the pack carrying the lead-acid battery paste required to produce negative plate active material and the remaining grids carrying the paste required to produce positive plate active material, (b) immersing the grids in the box in sulphuric acid having a specific gravity between 1.16 and 1.30 and passing an electric current between the grids to effect a forming operation on the grids and thereby convert the paste on the grids to the active material of the plates, the specific gravity of said acid rising during the passage of said current to a value between 1.26 and 1.35 at the end of the forming step, (c) when forming is complete, draining sufficient of said forming acid from the box to prevent the retained forming acid electrically connecting the formed plates during storage, and (d) sealing the container with means which prevents ingress of air into the container but allows escape of gases generated in the container.

In the battery according to the first aspect of the invention and the battery produced by the method according to the second aspect of the invention, the strength of the acid retained by the battery is sufficient to maintain a highly acidic environment for the positive plates during storage. Moreover, the fact that the retained acid is the acid employed in forming the plates avoids the necessity for an extra rinsing step. In addition, since the retained forming acid has a specific gravity between 1.26 and 1.35, activation of the battery can be effected with the same or a lesser strength sulphuric acid than that normally employed to activate dry, charged batteries, i.e. having a specific gravity of 1.26.

Preferably, the specific gravity of the forming acid at the start of step (b) is between 1.21 and 1.30.

More preferably, the specific gravity of the forming acid at the start of steb (b) is between 1.22 and 1.25.

Preferably, the amount of said retained acid is such that each positive plate contains at least 0.1 cc of the acid/gm of active material. This ensures maximum protection of the positive plate grids.

Preferably, step (b) includes a period of standing of at least 30 minutes without passage of the electric current and the temperature of the forming acid is allowed to rise to at least 150° F. prior to the standing period. During the period of standing the lead dioxide of the positive plates is believed to be converted to a chemically resistant form and, by allowing the acid temperature prior to standing to reach at least 150° F., the standing period can be decreased to 30 minutes.

Preferably, the container is sealed substantially immediately after draining of the forming acid so as to minimise oxidation of the negative plates and consequential loss in initial battery power.

In the accompanying drawings, which illustrate a method according to one example of the invention, of producing a multi-cell lead-acid battery, FIG. 1 is a perspective view of a battery box during assembly of packs of battery plate grids and separators into the box, FIG. 2 is a part sectional view of a battery box illustrating the completion of the intercell connections, and FIG. 3 is a sectional view of a vent plug for sealing one cell compartment against ingress of air.

Referring to the drawings, the method shown involves initially producing lead alloy grids 11 each of which carries the lead-acid battery paste required to produce a positive or negative battery plate after conversion of the paste into the active material of the plate. The composition of the paste is entirely conventional and will not therefore be described in detail, although it is to be appreciated that the paste will always contain some sulphuric acid. The grids 11 are then assembled into packs 12 with insulating separators 13 being interposed between the grids 11 and with each pair of adjacent grids in a given pack carrying the paste required to produce a negative battery plate and a positive battery plate respectively.

The packs 12 are then inserted into a battery box 14 which is moulded from a thermoplastic material preferably polypropylene and is divided into six cell compartments 15 by parallel, spaced partition walls 16. Each cell compartment 15 receives a respective pack 12 and in each of the four packs received in the central compartments of the box 14, each grid which is to define a positive plate is connected to a conductive lug 17 and each grid which is to define a negative plate is connected to a conductive lug 18. Each of the lugs 17, 18 includes an integral extension which, in use, extends substantially parallel to the partition walls 16 and each of the lugs 17 is further formed with a projecting spigot 17a integral with its respective extension. Each of the packs 12 which is received in an end compartment of the box 14 has one set of grids connected to a lug 17 or 18 and its other set of grids connected to a terminal post 19.

As shown in FIG. 2, the partition walls 16 have holes 16a stamped therein and arranged so that when the packs 12 are assembled in the box 14, each spigot 17a extends through a respective hole 16a into engagement with the extension of a lug 18 in an adjacent compartment. Of course, it will be appreciated that the partition walls 16 have to be flexed to permit the packs 12 to be positioned in the box 14. When all the packs 12 are in position, the required intercell connections are completed using the resistance welding tool shown at 21 in FIG. 2. The tool 21 includes a pair of electrodes 22,23 which are engaged in turn with the extensions respectively of each pair of lugs 17,18 to resistance weld the lugs together. During the resistance welding operation, the electrodes 22, 23 simultaneously press the extensions of the lugs 17,18 against the respective partition wall 16 and pass current between the extensions through the spigot 17a so that the spigot melts and fills the hole 16a in the partition wall.

When the intercell connections are complete, the box is closed by welding to the box, a battery lid (not shown) which is moulded in a thermoplastic material, again preferably polypropylene and which has a peripheral edge adapted to engage the top peripheral edge of the box and ribs adapted at their free ends to engage the tops of the partition walls. Welding is effected by pressing the flat surfaces defined by the top of the box and said peripheral edge and rib ends of the lid against opposite surfaces respectively of a heater plate (not shown) so that said flat surfaces are softened. The heater plate is then removed and the softened portions of the lid and the box are pressed into engagement so that the lid becomes butt welded. to the box 14.

When the box has been closed by the lid, each cell compartment 15 is filled with sulphuric acid of specific gravity between 1.16 and 1.30, or preferably between 1.21 and 1.30 or more preferably between 1.22 and 1.25. Thereafter, the terminal posts 19 are connected to a d.c. source and an electric current is passed between the posts to effect a forming operation on the grids 11 and thereby convert the paste on the grids 11 into the active material of the plates. Since the paste on the grids is entirely conventional, the passage of current converts the paste on the grids which are to define negative battery plates into metallic lead and converts the paste on the grids which are to define positive plates into lead dioxide. During the forming operation, the temperature and specific gravity of the sulphuric acid within the compartments 15 rises, the magnitude of the current passed between the terminals 19 preferably being arranged so that the temperature of the acid increases to a value in excess of 150° F. but normally not greater than 210° F.

As the forming operation progresses, the charge on the partly formed plates increases and when the charge reaches at least 50% and preferably at least 90% of the required final charge on the plates, the passage of the electric current between the terminals 19 is ceased. In fact, the charge on the plates can be allowed to rise as high as, or beyond, the required final charge before the passage of current is ceased.

When the passage of the electric current has been terminated the battery plates are allowed to stand in the hot sulphuric acid for a period of at least thirty minutes. Normally the period of standing is between forty-five minutes and thr e hours, the time depending upon the temperature of the acid at the end of the forming operation. During standing, the positive plates undergo a chemical reaction which is believed to partially sulphate the active material of the positive plates such that on subsequent charging the sulphate material is converted to a chemically resistant form of lead dioxide. In this way the ability of the positive plates to withstand long periods of storage, without deterioration of the active material, is improved.

During standing some discharge of the plates inevitably occurs and so, after standing, an electric current, preferably of the same magnitude as previously, is passed between the terminals 19 to either complete formation of the plates or return the charge on the plates to the required final value.

During forming the acid in the box bubbles vigorously as the gases generated by the forming reactions escape through the apertures which are necessarily provided in the lid to allow filling and venting of the battery in service. This can lead not only to an acid laden mist being expelled through the apertures but also, in extreme conditions, in the acid solution bubbling out of the apertures. It is therefore desirable to provide above each aperture, means for collecting any expelled acid and returning it to the box.

On completion of the formation operation or the formation and recharging operation, the box is inverted to allow the forming acid to drain from the box, through the filling and venting apertures, the specific gravity of the acid having risen by this stage to between 1.26 and 1.35 depending, of course, on the initial concentration of the forming acid. After drainage, some of the forming acid is necessarily retained in the box, mainly being absorbed in the active material of the plates. In some cases, however, some of the retained acid can be free in the bottom of the box provided it is of insufficient depth to electrically connect the plates when the battery is stored in its normal upright position. Preferably, the draining operation is arranged so that each positive plate retains at least 0.1 cc of the forming acid per gram of positive plate active material, and conveniently so that the amounts of retained acid per gram of each separator and negative plate active material are at least 0.6 and 0.09 cc respectively.

After drainage of the forming acid, and without performing an acid rinsing step, the filling and venting apertures are sealed against ingress of air using vent plugs of the kind shown in FIG. 3. Each vent plug includes a hollow, generally cup-shaped body 31 which tapers inwardly towards its base 32 and which is formed with an external, circumferential flange 33 at its open end 34. The taper on the body 31 is such that in use when inserted into an aperture in the battery lid, the tapering wall sealingly engages the lid, while the flange 33 provides an abutment to prevent the body 31 being pushed through the aperture. Moulded integrally with the base 32 is a centrally disposed, tapering spigot 35 which is provided to facilitate removal of the vent plug when it is required to activate the battery.

Integral with the base 32 is a flap 36 which normally seals an opening 37 in the base, but which is capable of flexure into the interior of the body 31 to allow fluid to flow through the opening 37. The flap is however, held by abutment with the wall of the opening 37 against flexure towards the exterior of the body 31, and hence defines a valve member which permits the flow of fluid into the body 31 but resists fluid flow in the opposite direction. Thus, when the vent plug is inserted into an aperture in the battery lid, the flap 36 substantially prevents the ingress of air and/or moisture into the batter casing, but any gases generated within the battery casing can escape through the opening 37 when they are of sufficient pressure to overcome the inherent resilience of the flap 36. Typically, the vent plug is arranged so that the flap 36 can flex to permit gas escape through the opening 37 when the gas pressure within the battery casing is between 0.3 and 1.0 psig.

After insertion of the vent plugs, the battery can be stored for long periods substantially without discharge or deterioration of the plates, the high specific gravity of the retained forming acid ensuring that environment of the positive plates remains strongly acidic. When required for service, the battery can be activated by adding the normal strength acid (SG 1.26) used for activation of dry, charged batteries, whereupon it is ready for immediate use.

I claim:

1. A method of producing a lead-acid battery capable of activation by the addition of electrolyte thereto, the method comprising the steps of:
    (a) starting with a battery container accommodating at least one pack of battery plate grids having insulating separators interposed between adjacent grids, one set of grids in the pack carrying the lead-acid battery paste required to produce negative plate active material and the remaining grids carrying the paste required to produce positive plate active material,
    (b) immersing the grids in the box in sulphuric acid having a specific gravity between 1.21 and 1.30 and passing an electric current between the grids to effect a forming operation on the grids and thereby convert the paste on the grids to the active material of the plates, the specific gravity of said acid rising during the passage of said current to a value between 1.26 and 1.35 at the end of the forming step,
    (c) when forming is complete, draining sufficient of said forming acid from the box to prevent the retained forming acid electrically connecting the formed plates during storage, the amount of said retained acid being such that each positive plate contains at least 0.1 cc of the acid/gm of active material, and
    (d) sealing the container with means which prevents ingress of air into the container but allows escape of gases generated in the container.

2. A method as claimed in claim 1, wherein the specific gravity of the forming acid at the start of step (b) is between 1.22 and 1.25.

3. A method as claimed in claim 1, wherein the amount of said retained acid is such that each positive plate contains at least 0.1 cc of the acid/gm of active material.

4. A method as claimed in claim 1, wherein step (b) includes a period of standing of at least 30 minutes without passage of the electric current and the temperature of the forming acid is allowed to rise to at least 150° F. prior to the standing period.

5. A method as claimed in claim 1, wherein the container is sealed substantially immediately after draining of the forming acid.

6. A method as claimed in claim 1, wherein the container includes a battery box which is closed by a lid and which is divided by partition walls into a plurality of cell compartments each containing one of said packs of battery plate grids and separators, the lid being formed with apertures which communicate with the cell compartments respectively and through which said sulphuric acid is drained, and the apertures being sealed during step (d).

7. A lead-acid battery capable of activation by the addition of electrolyte thereto produced by a method as claimed in claim 1.

* * * * *